United States Patent
Groenheden

(10) Patent No.: US 11,146,143 B2
(45) Date of Patent: Oct. 12, 2021

(54) OPERATING A WIND TURBINE GENERATOR COOLING SYSTEM

(71) Applicant: Siemens Gamesa Renewable Energy A/S, Brande (DK)

(72) Inventor: Ebbe Groenheden, Horsens (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 370 days.

(21) Appl. No.: 16/178,730

(22) Filed: Nov. 2, 2018

(65) Prior Publication Data

US 2019/0140518 A1    May 9, 2019

(30) Foreign Application Priority Data

Nov. 8, 2017 (EP) .................... 17200636

(51) Int. Cl.
*H02K 9/26* (2006.01)
*H02K 9/04* (2006.01)
(Continued)

(52) U.S. Cl.
CPC ............. *H02K 9/04* (2013.01); *B01D 53/261* (2013.01); *F03D 9/25* (2016.05); *F03D 80/60* (2016.05); *F03D 80/80* (2016.05); *H02K 7/1838* (2013.01); *H02K 9/18* (2013.01); *H02K 9/26* (2013.01); *F03D 17/00* (2016.05);
(Continued)

(58) Field of Classification Search
CPC .. H02K 9/00; H02K 9/02; H02K 9/04; H02K 9/06; H02K 9/08; H02K 9/10; H02K 9/12; H02K 9/24; H02K 9/26; H02K 7/1838; F03D 80/00; F03D 80/60; F03D 80/80; F03D 9/25; F03D 17/00; B01D 53/26; B01D 53/261; B01D 53/263; F24F 12/00; F24F 12/001; F24F 12/006
See application file for complete search history.

(56) References Cited

U.S. PATENT DOCUMENTS

| 7,427,814 B2 * | 9/2008 | Bagepalli ................. F03D 9/25 290/55 |
| 9,624,908 B2 * | 4/2017 | Airoldi .................. F03D 15/20 |

(Continued)

FOREIGN PATENT DOCUMENTS

| CN | 101042114 A | 9/2007 |
| CN | 101888148 A | 11/2010 |

(Continued)

OTHER PUBLICATIONS

Non-English Chinese Office Action for Application No. 201811325454.0, dated May 7, 2020.
(Continued)

*Primary Examiner* — Edgardo San Martin
(74) *Attorney, Agent, or Firm* — Schmeiser, Olsen & Watts LLP

(57) ABSTRACT

Provided is a method for removing moisture from a cooling air filter installed for filtering first cooling air for cooling a generator from a first end, the method including: pressurizing second cooling air cooling the generator from a second end; allowing the second cooling air having received heat from the generator to pass through the cooling air filter, in order to absorb and thereby reduce moisture from the cooling air filter.

15 Claims, 2 Drawing Sheets

Figure 1:
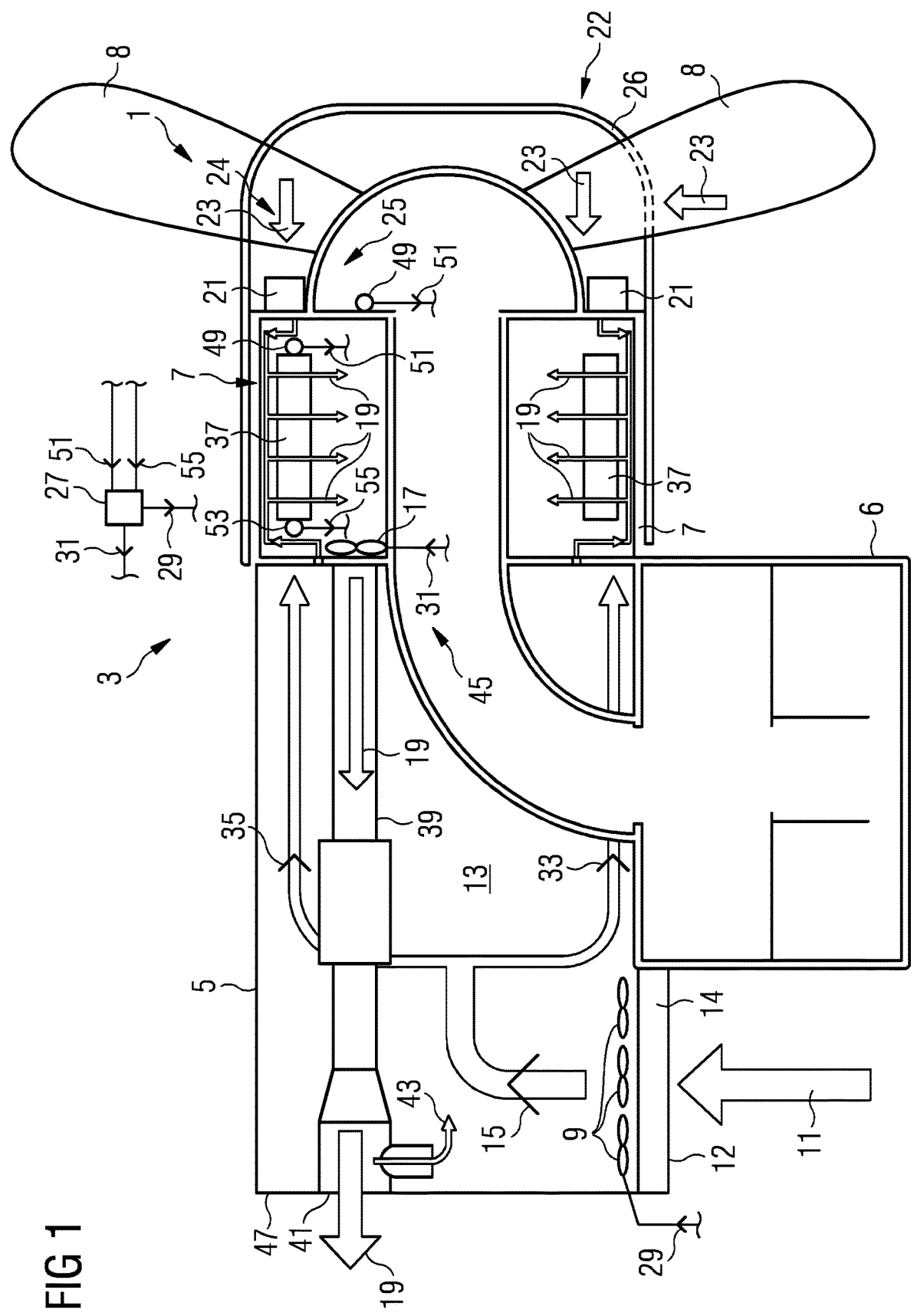

(51) Int. Cl.
  H02K 9/06 (2006.01)
  F03D 80/60 (2016.01)
  F03D 9/25 (2016.01)
  H02K 7/18 (2006.01)
  F03D 80/80 (2016.01)
  H02K 9/18 (2006.01)
  B01D 53/26 (2006.01)
  F03D 17/00 (2016.01)

(52) U.S. Cl.
  CPC ..... *F05B 2220/706* (2013.01); *F05B 2260/20* (2013.01); *F05B 2270/303* (2013.01); *F05B 2270/325* (2013.01)

(56) References Cited

U.S. PATENT DOCUMENTS

| | | | |
|---|---|---|---|
| 10,359,028 B2 * | 7/2019 | Ma | F03D 9/28 |
| 10,415,549 B2 * | 9/2019 | Airoldi | F03D 80/55 |
| 10,495,068 B2 * | 12/2019 | Airoldi | H02K 1/32 |
| 10,605,234 B2 * | 3/2020 | Airoldi | F03D 80/80 |
| 10,677,226 B2 * | 6/2020 | Soerensen | H02K 7/1838 |
| 11,009,011 B2 * | 5/2021 | Groenheden | F03D 80/60 |
| 2007/0222223 A1 | 9/2007 | Bagepalli et al. | |
| 2010/0140952 A1 | 6/2010 | Jansen | |
| 2014/0346781 A1 | 11/2014 | Airoldi et al. | |
| 2015/0372565 A1 * | 12/2015 | Airoldi | H02K 9/04 290/55 |
| 2016/0233742 A1 * | 8/2016 | Airoldi | H02K 9/22 |
| 2018/0019642 A1 * | 1/2018 | Wang | F03D 9/25 |
| 2018/0038351 A1 * | 2/2018 | Jacobsen | F03D 80/60 |
| 2018/0069442 A1 | 3/2018 | Ma et al. | |
| 2018/0080435 A1 | 3/2018 | Ma et al. | |
| 2019/0277263 A1 * | 9/2019 | Airoldi | F03D 80/60 |
| 2020/0011303 A1 * | 1/2020 | Airoldi | F03D 80/80 |
| 2020/0116133 A1 * | 4/2020 | Airoldi | H02K 9/22 |

FOREIGN PATENT DOCUMENTS

| | | | | |
|---|---|---|---|---|
| CN | 202096855 U | 1/2012 | | |
| CN | 104179641 A | 12/2014 | | |
| CN | 104810942 A | 7/2015 | | |
| CN | 105553182 | 5/2016 | | |
| CN | 106523282 A | 3/2017 | | |
| EP | 1736665 A2 | 12/2006 | | |
| EP | 3508720 A1 * | 7/2019 | ............ | F03D 80/60 |
| JP | 2014003584 A | 1/2014 | | |
| JP | 2014033584 A | 2/2014 | | |
| WO | 2011091863 A1 | 8/2011 | | |

OTHER PUBLICATIONS

European Search Report for Application No. 17200636.3, dated May 14, 2018.

* cited by examiner

OPERATING A WIND TURBINE GENERATOR COOLING SYSTEM

CROSS-REFERENCE TO RELATED APPLICATIONS

This application claims priority to EP Application No. 17200636.3, having a filing date of Nov. 8, 2017, the entire contents of which are hereby incorporated by reference.

FIELD OF TECHNOLOGY

The following relates to a method for removing moisture from a cooling air filter of a cooling system for cooling a generator, in particular of a wind turbine, relates further to a method for operating a cooling system for cooling a generator, relates to a cooling system for cooling a generator and in particular also relates to a wind turbine comprising the cooling system.

BACKGROUND

During operation of a generator of a wind turbine, electric currents in the windings of the stator of the generator generate heat thereby increasing the temperature of the windings and the generator, in particular the generator lamination. For reducing the temperature, conventionally a cooling system may be provided. The cooling system may utilize ambient air for cooling. For this purpose, the cooling system may comprise one or more filters to remove particles from the ambient air before supplying the ambient air as cooling air to the generator.

In humid conditions, the filter supplying the cold air to the generator may be at risk of getting wet which may result in reduced cooling performance of the cooling system due to larger pressure losses through the filter material. Tests have shown a 300% increase in filter pressure loss when the filter material is wet.

Drying the filter by the ambient air may take a long time such as 6 hours based on tests. During this relatively long time period, the performance of the cooling system will be considerably lower than during normal operation due to lower flow rate of air being passed through the filter and thus contribute to the cooling the generator.

Thus, there may be a need for a method for removing moisture from a cooling air filter, there may be a need for a method for operating a cooling system for cooling a generator and there may be a need for a cooling system, wherein the performance or capacity of the cooling system may be maintained during different environmental conditions and wherein a reliable and sufficient cooling of a generator may be enabled.

SUMMARY

An aspect relates to a method for removing moisture from a cooling air filter installed for filtering first cooling air for cooling a generator from a first end, the method comprising: pressurizing second cooling air cooling the generator from a second end; allowing the second cooling air having received heat from the generator to pass through the cooling air filter, in order to absorb and thereby reduce moisture from the cooling air filter.

The method may be performed partly in software and/or hardware. The cooling air filter may be installed at or close to a hub of a wind turbine. Thus, the first cooling air may, during a regular cooling operation, enter towards the generator through a first cooling air inlet opening close to or at the hub. The cooling air filter may be configured for filtering (e.g. solid) particles and/or dust and/or salt and may also be configured to absorb water of humid ambient air.

The generator may be a synchronous permanent magnet generator or may be any other kind of generator capable of generating electric energy upon rotation of a rotor. The rotor may be coupled to the hub at which plural rotor blades may be connected.

The first end may be a first axial end, i.e. an end of the generator facing the hub. The first cooling air (and also second cooling air) may be conveyed during a regular cooling operation towards a lamination of the generator and may be guided through a channel system provided within the lamination of the generator in order to cool the lamination and thereby also in order to cool one or more winding sets of the generator.

Pressurizing the second cooling air (in particular entering from a back portion of the nacelle) may be performed by sending appropriate control signals to different fans which drive the flow of the (first and/or second) cooling air and which may also drive the cooling air being heated by reception of heat from the generator. In particular, the different fans may be operated or controlled such that particular pressure conditions are achieved which drive the second cooling air having received heat from the generator to pass through the cooling air filter. In particular, the second cooling air may be pressurized (in particular within a particular space region, such as a nacelle) to have a pressure higher than an ambient pressure (outside the nacelle or the space region). In particular, the second cooling air having received heat from the generator may be driven (by the pressure conditions) to pass through the cooling air filter in a direction opposite to a flow direction of first cooling air during a regular cooling operation which passes from outside through the cooling air filter towards the generator. By passing the heated second cooling air through the cooling air filter (opposite to a flow direction of first cooling air during regular cooling operation), moisture may be absorbed and carried to an outside, thereby drying the cooling air filter. Thus, the performance of the cooling air filter may be improved in that the cooling air filter may not cause an inacceptable pressure loss during the regular cooling operation. Thereby, the performance and efficiency of the cooling system may be improved.

According to an embodiment of the present invention, the method is triggered by: measuring a first temperature value at or close to the first end; measuring a second temperature value at or close to the second end; comparing the first temperature value with the second temperature value; determining that the first temperature value is greater than the second temperature value by at least a threshold.

In particular, methods according to embodiments of the present invention provide a regular cooling operation which may be interrupted by a moisture removing operation in the case that moisture needs to be removed from the cooling air filter. The moisture removing operation may then be entered upon detecting that the cooling efficiency at the first end is worse than the cooling efficiency at the second end. The cooling efficiency at the first end may be detected by measuring the first temperature value at or close to the first end and the cooling efficiency at the second end may be detected by measuring the second temperature value at or close to the second end. When the cooling efficiency at the first end is worse than the cooling efficiency at the second end, the first temperature value is expected to be higher (in particular higher at least by a threshold) than the second temperature value. Thereby, a simple method for detecting the different cooling efficiency at the first end and the second end is provided. Thereby, conventionally installed temperature sensors may be utilized which may be regularly installed at the first end and the second end of the generator, in particular in order to measure temperatures of different winding sets at different ends of the generator.

If it is determined that the first temperature value is greater than the second temperature value by at least a threshold (for example by temperature difference between 1 K and 20 K), then the regular cooling operation may be interrupted or terminated and the moisture removing operation may be started. Thus, a criterion for which the switching is performed is defined. According to other embodiments, other criteria may be applied to decide when and for how long to switch from the regular cooling operation to the moisture removing operation and vice versa.

According to other embodiments of the present invention, the moisture removing operation may last a predetermined time duration after which it is switched back to the regular cooling operation. During the moisture removing operation, the generator may still be cooled but only by the second cooling air which enters the generator from the second size, but not by the first cooling air, since during the moisture removing operation, the first cooling air does not enter towards the generator from the first end. Thus, it is expected that during the moisture removing operation, the first temperature value remains to be greater than the second temperature value, since at the second side (close to the second temperature sensor), cooling by the second cooling air prevails, while at the first side, no cooling occurs or at least much less cooling occurs, since the second cooling air has received heat from the generator by or during the flow from the second end partly also to the first end.

According to an embodiment of the present invention, the first temperature value substantially equals or is indicative of a winding head temperature of the generator at the first end, wherein the second temperature value substantially equals or is indicative of a winding head temperature of the generator at the second end. For a safe and reliable operation, the temperature at different regions of the generator may be required to be maintained within certain temperature limits. In particular, the winding set and the lamination may be required to be maintained at or between certain temperature limits. Thus, by measuring the winding head temperatures at the first end and the second end may provide reasonable temperature values in order to operate the generator within desired limits and increase the lifetime of the generator. The generator may comprise one or more winding sets, in particular one or more three-phase winding sets.

The method of moisture removing operation may last between 15 min and 45 min, in particular between 20 min and 40 min. The duration may be adjusted depending on the particular application, in particular depending on the size and volume of the cooling air filter and depending on the capacity of second cooling air or depending on the second cooling air flow rate. According to experimental tests, drying a cooling air filter may be completed in about 30 min. Thus, regular cooling operation may be restarted after a relatively short time in order to ensure effective cooling of the generator.

According to an embodiment of the present invention, the pressuring comprises: turning on to maximal capacity or at least increasing capacity of inlet fans that convey ambient air into a space region as the second cooling air, in order to increase the pressure of the second cooling air within the space region; and/or turning off or at least reducing capacity of heated cooling air withdrawal fans that are installed to withdraw cooling air being heated by heat reception from the generator.

Adjusting the capacity or air throughput (e.g. flow rate) of the inlet fans and the heated cooling air withdrawal fans may be performed separately or in combination. According to one embodiment of the present invention, the capacity or throughput of the inlet fan(s) may be maintained at their respective settings as used during the regular cooling operation and only the heated cooling air withdrawal fan(s) may be adjusted to have reduced capacity (compared to the regular cooling operation). Alone by reducing the capacity or throughput of the heated cooling air withdrawal fans, the second cooling air may be pressurized such that the heated second cooling air may exit via the cooling air filter in order to dry the cooling air filter.

In order to further enhance the moisture removing capacity during the moisture removing operation, additionally the inlet fan(s) may be increased in their capability or capacity and may in particular be set to a maximum capacity in order to enhance the pressurizing, i.e. to increase the pressure of the second cooling air within the space region. Thereby, a pressure gradient from the space region towards the environment (e.g. outside the nacelle) may be increased in order to increase the flux or flow rate of the heated second cooling air through the cooling air filter towards the environment.

By controlling the inlet fans and/or the heated cooling air withdrawal fans appropriately regarding their respective capacity, any desired pressure gradient may be achieved so that any desired flux of the heated second cooling air through the cooling air filter may be achieved, in order to enable effective drying in an acceptable or predetermined time interval.

According to an embodiment of the present invention, the heated cooling air withdrawal fans are configured to, when turned on during a regular cooling operation, convey the heated cooling air to an outside, wherein the heated cooling air in particular comprises heated first cooling air and heated second cooling air. The heated cooling air withdrawal fans may be provided to convey the heated cooling air to an outside during the regular cooling operation. In particular, during the regular cooling operation, the heated cooling air is not conveyed through the cooling air filter towards the outside, but the first cooling air enters from the outside through the cooling air filter towards the generator.

The heated first cooling air and the heated second cooling air may combine and may be commonly guided through a cooling air exit duct to a regular cooling air exit opening (for example at a back of the nacelle). Thus, only one exit opening may be required for the regular cooling operation, thereby simplifying the cooling system.

According to an embodiment of the present invention, the space region is at least a portion of an inside of a nacelle; and/or the cooling filter comprises at least one particle filter, in particular F7 filter, filtering particles having a size of between 0.3 and 10 µm; and/or the first end of the generator is closer to a hub at which plural blades are connected than the second end of the generator.

The nacelle may comprise, beside the generator, other components, such as a gearbox, electronic components, such as a wind turbine controller, wind turbine converter, a wind turbine transformer and so forth. All these components may additionally also be cooled by the first cooling air and/or the second cooling air. Thereby, the method may support in particular to cool a generator of a wind turbine. Furthermore, the cooling filter may effectively filter out particles and/or salt and/or moisture from the environment, in order not to hamper the integrity of the generator, in particular the integrity of bearings of the generator which may support a rotor relative to the stator of the generator. Thereby, the generator and other components within the nacelle may be protected from damage.

According to an embodiment of the present invention, it is provided a method for operating a cooling system for cooling a generator, in particular of a wind turbine, comprising: cooling the generator according to a regular cooling operation; and performing a moisture removing operation according to a method of one of the preceding claims.

The moisture removing operation may be performed only occasionally when there is an indication that the cooling air filter is too humid, such that a pressure gradient of the first cooling air running through the cooling air filter exceeds a threshold such that the performance of the cooling by the first cooling air becomes too low. When the moisture removing operation is entered, advantageously humidity or moisture from the cooling air filter may be removed. After that, entering the regular cooling operation may be performed ensuring a sufficient performance of the cooling system.

According to an embodiment of the present invention, during the regular cooling operation the method comprises: running the inlet fans to convey ambient air into the space region as the second cooling air; running the heated cooling air withdrawal fans to withdraw cooling air being heated by heat reception from the generator and in particular convey it via a regular cooling air exit opening through which all of the heated cooling air flows to the outside.

Also during the regular cooling operation, the inlet fans may be controlled regarding their capacity, for example also depending on the first temperature value and/or second temperature value, for example for considerably or essentially maintaining the first temperature value and/or second temperature value within a predetermined range. In particular, the capacity of the inlet fan may be continuously controlled using a conventional controller which may form an error temperature between the first temperature value, second temperature value and a reference temperature. Also the heated cooling air withdrawal fans may be controlled during the regular cooling operation, for example depending on the measured temperature values as it may be done in conventional cooling systems.

The heated cooling air withdrawal fans may suck heated cooling air away from the generator and may generate a higher pressure in the cooling air exit duct such that the heated cooling air is conveyed through the exit duct and is expelled to the outside having a pressure less than the pressure within the cooling air exit duct. Thereby, a defined flow path of the first cooling air, the second cooling air and the heated cooling air during the regular cooling operation as well as during the moisture removing operation may be ensured.

According to an embodiment of the present invention, during the moisture removing operation at least a portion of the heated cooling air is conveyed to an outside via the cooling filter in a heated cooling air flow direction substantially opposite to a flow direction of the first cooling air during a regular cooling operation. Thereby, the moisture is effectively transported away from the cooling air filter towards the outside or environment. The temperature of the heated cooling air which passes through the cooling air filter may be adjusted appropriately, for example by adjusting the capacity of the inlet fans and/or the heated cooling air withdrawal fans.

According to an embodiment of the present invention, during the moisture removing operation at least another portion of the heated cooling air is conveyed to an outside, in particular via the shut off heated cooling air withdrawal fans and, via the regular cooling air exit opening, wherein the regular cooling air exit is in particular at a back of the nacelle.

According to still other embodiments, all of the heated cooling air may be conveyed to an outside via the cooling filter (e.g. involving closing the regular cooling air exit), without conveying any of the heated cooling air through the regular cooling air exit opening, in order to even further increase the drying efficiency during the moisture removing operation.

According to an embodiment of the present invention, during the regular cooling operation the first cooling air and the second cooling air pass, from radially outwards through at least one cooling channel in a lamination of the generator running radially inwards and is sucked from the generator and conveyed into an cooling air exit duct leading to the regular cooling air exit opening. Thereby, conventional cooling methodologies applied to a wind turbine generator may be supported. The lamination may be comprised of stacked sheets of ferromagnetic material.

According to an embodiment of the present invention, during the regular cooling operation the first cooling air and the second cooling air cool the generator from the first side and from the second side, respectively and heated first cooling air and heated second cooling air commonly exit at the back of the nacelle. Thereby, a conventional design of a wind turbine may be supported.

It should be understood that features individually or in any combination disclosed, explained or mentioned in the context of a method for removing moisture from a cooling air filter or mentioned in the context of a method for operating a cooling system for cooling a generator may also be applied, individually or in any combination, to a cooling system for cooling a generator according to embodiments of the present invention and vice versa.

According to an embodiment of the present invention, it is provided a cooling system for cooling a generator, in particular of a wind turbine, the system comprising: inlet fans; heated cooling air withdrawal fans; a cooling air filter; and a controller configured to supply control signals to the inlet fans and to the heated cooling air withdrawal fans, to control the inlet fans to convey ambient air into a space region as second cooling air and pressurize the second cooling air; and to control the heated cooling air withdrawal fans to withdraw cooling air being heated by heat reception from the generator and further to allow the second cooling air having received heat from the generator to pass through the cooling air filter, in order to absorb and thereby reduce moisture from the cooling air filter.

The controller may control the inlet fans and/or the heated cooling air withdrawal fans regarding for example switching them on or off and/or in order to adjust their conveying capacity, for example by adjusting a rotational speed of rotor blades of the fans. The cooling system may be configured to perform a method according to one of the above-mentioned embodiments.

The cooling system may further comprise a first temperature sensor configured to measure a first temperature value at or close to a first end of the generator; a second temperature sensor configured to measure a second temperature value at or close to a second end of the generator; wherein the controller is further configured to compare the first temperature value with the second temperature value and trigger a moisture removing operation to remove moisture from the cooling air filter, if the controller determines that the first temperature value is greater than the second temperature value by at least a threshold.

According to a further embodiment of the present invention, a wind turbine is provided which comprises a cooling system according to one of the above-mentioned or described embodiments.

BRIEF DESCRIPTION

Figure 2:
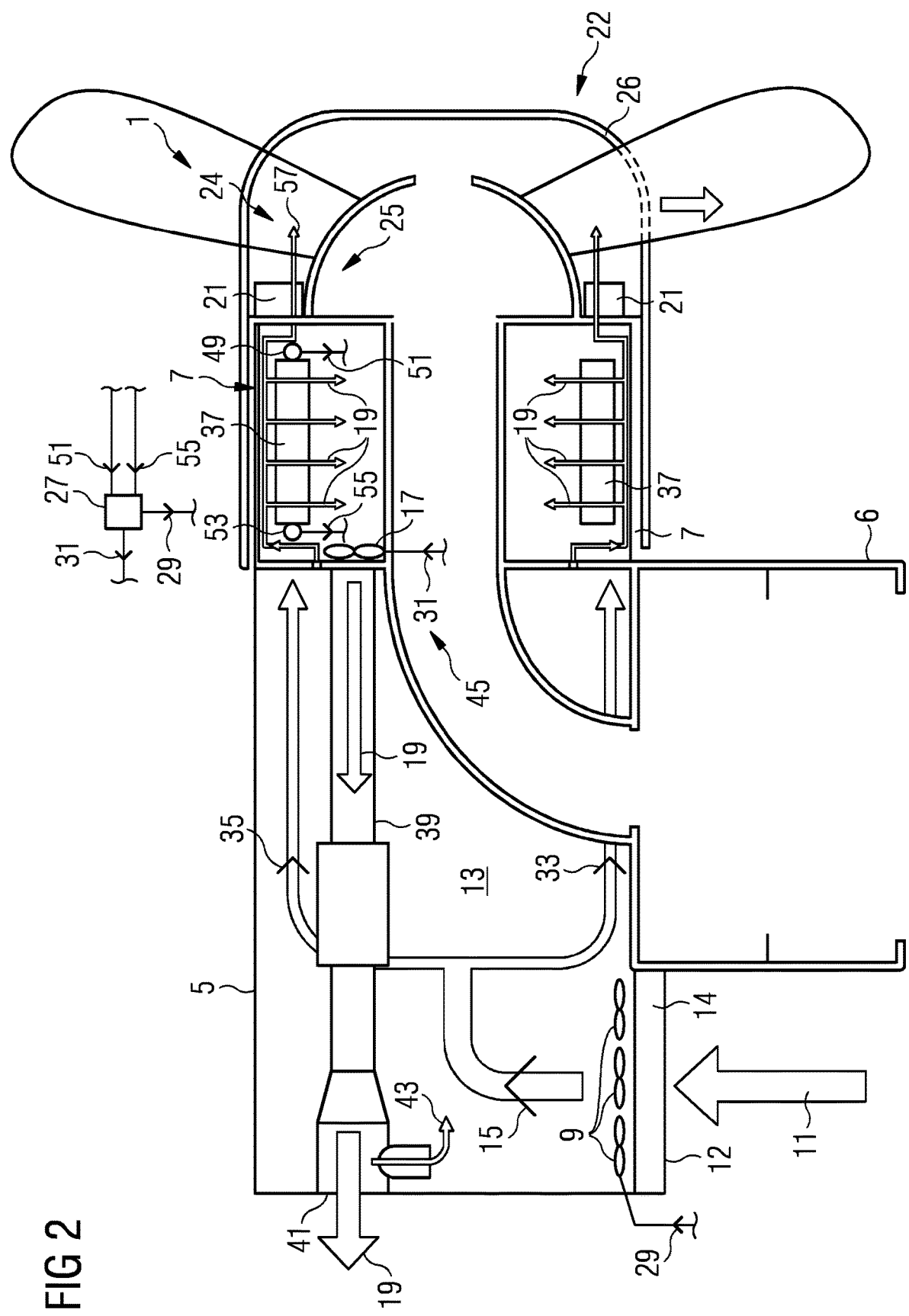

Some of the embodiments will be described in detail, with reference to the following figures, wherein like designations denote like members, wherein:

FIG. 1 schematically illustrates a wind turbine comprising a cooling system during a regular cooling operation which system is configured for carrying out a method; and FIG. 2 schematically illustrates the wind turbine during a moisture removing operation.

DETAILED DESCRIPTION

The wind turbine 1 schematically illustrated in FIG. 1 according to an embodiment of the present invention comprises a cooling system 3 according to an embodiment of the present invention which is adapted to carry out a method for operating a cooling system according to an embodiment of the present invention including a method for removing moisture from a cooling air filter according to an embodiment of the present invention.

The wind turbine 1 comprises a nacelle 5 in which a generator 7 and the cooling system 3 are arranged. Within the nacelle 5, further components, for example a (not illustrated) gearbox, a converter and a transformer, may also be arranged. The cooling system 3 comprises inlet fans 9 which are configured to convey ambient air 11 into a space region 13 (in particular the inside of the nacelle 5) as second cooling air 15. In particular, the inlet fans 9 are configured to increase the pressure of the second cooling air 15 within the space region 13, in particular during a moisture removing operation illustrated in more detail in FIG. 2.

The cooling system 3 further comprises heated cooling air withdrawal fans 17 which are installed to withdraw cooling air being heated by heat reception from the generator 7, wherein the heated cooling air is labelled with reference sign 19. The cooling system 3 further comprises a cooling air filter 21 which is installed for filtering first cooling air 23 for cooling the generator 7 from a first end 25.

Plural rotor blades 8 are mounted at the hub 22 and rotate together with a hub cap 26. The filter 21 is also rotating with the hub 22, the blades 8 and the cap 26 having at least one cooling opening via which cooling air 23 can enter. The cap 26 extends axially to substantially enclose the generator 7.

The cooling system 3 further comprises a controller 27 which is configured to supply control signals 29, 31 to the inlet fans 9 and to the heated cooling air withdrawal fans 17, respectively. Thereby, the inlet fans 9 may be controlled by the controller 27 to convey ambient air 11 into the space region 13 as the second cooling air 15 and also to pressurize the second cooling air 15. The controller is further configured to control, by the control signals 31, the heated cooling air withdrawal fans 17 to withdraw cooling air being heated by heat reception from the generator (the heated cooling air is labelled with reference sign 19) and further to allow the second cooling air 15 which has received heat from the generator 7 (i.e. heated cooling air 19) to pass through the cooling air filter 21, in order to absorb and thereby reduce moisture from the cooling air filter 21.

FIG. 1 illustrates the air flow during a regular cooling operation. During the regular cooling operation, the first cooling air 23 having passed through cooling air filter 21 and the second cooling air 15 (which is divided in two branches 33, 35 in the sectional view of FIG. 1) pass, from radially outwards through at least one cooling channel in a lamination 37 of the generator 7 running radially inwards. The heated cooling air 19 is then sucked from the generator 7 by operating the heated cooling air withdrawal fans 17 and conveyed into a cooling air exit duct 39 leading to a regular cooling air exit opening 41. A portion 43 of the heated cooling air 19 is branched off in front of the regular cooling air exit opening 41 and is guided back into the space region 13 to mix with the second cooling air 15, in order to reduce the humidity of the second cooling air 15.

During the regular cooling operation, the second cooling air 15, 33, 35 and the first cooling air 23 cool the generator 7 from the first side 25 and from a second side 45, respectively, and the heated first cooling air and heated second cooling air (combined labelled as 19) commonly exit at the back 47 of the nacelle 5 through exit 41. During the regular cooling operation as illustrated in FIG. 1, the cooling air filter 21 may become humid or wet which may degrade the capacity of the cooling system, since the humid or wet cooling air filter 21 causes a considerable pressure drop, reducing the throughput of the first cooling air 23 through the cooling air filter 21.

For detecting a deteriorated performance of the cooling system 3, the cooling system 3 further comprises a first temperature sensor 49 installed at the first end 25, i.e. first coil heads, of the generator and configured to measure a first temperature value which is represented by a first measurement signal 51. The cooling system 3 further comprises a second temperature sensor 53 which is installed at the second end 45, i.e. second coil heads, of the generator and which is configured to measure a second temperature value which is represented as a second measurement signal 55. The controller 27 receives the first temperature value signal 51 as well as the second temperature value signal 55 and is configured to compare the first temperature value with the second temperature value and trigger a moisture removing operation to remove moisture from the cooling air filter 21, if the controller 27 determines that the first temperature value 51 is greater than the second temperature value 55 by at least a threshold indicating reduced first cooling performance.

When performing the moisture removing operation (illustrated in FIG. 2), the controller 27 generates and supplies respective control signals 29 and 31 to the inlet fans 9 and the heated cooling air withdrawal fans 17, respectively. Thereby, the inlet fans 9 and the heated cooling air withdrawal fans 19 are controlled such that the second cooling air 15 is pressurized within the space region 13 and the second cooling air having received heat from the generator (labelled as heated cooling air 19) is allowed to pass through the cooling air filter 21 as moisture removing air 57, in order to absorb and thereby reduce moisture from the cooling air filter 21.

In particular, during the moisture removing operation, the inlet fans 9 may all be turned on or in particular may be turned on to their maximum capacity and the heated cooling air withdrawal fans 17 may completely be turned off. Under these conditions, the second cooling air 15 mixed with the portion 43 of the heated cooling air enters the generator 7 from radially outwards and runs through channels within the lamination 37 radially inward thereby receiving heat from the generator resulting in heated cooling air 19. Because the heated cooling air withdrawal fans 17 are reduced in their capacity or even turned off completely, and because the inlet fans 9 run at an increased capacity or in particular run at maximum capacity, the pressure of the second cooling air and thereby also of the heated cooling air 19 in the generator 7 is relatively high, in particular higher than the pressure in the environment. Thus, most of the heated cooling air 19 pressurized within the generator 7 is expelled via the cooling air filter 21 as moisture removing air 57.

It should be noted that the moisture removing air 57 during the moisture removing operation has a flow direction which is opposite to a flow direction of the first cooling air 23 (shown in FIG. 1) passing through the cooling air filter during the regular cooling operation towards the generator 7. The heated cooling air 19 comprises heated first cooling air 23 and heated second cooling air 15 during the regular cooling operation.

The nacelle 5 is mounted on top of a turbine tower 6. The cooling air filter 21 is arranged close or at a hub 22 of the wind turbine at which rotor blades 8 are connected. The second cooling air 11, 15 enters via an inlet 12 and via a further cooling air filter 14 which may be arranged upstream the inlet fans 9.

In the normal cooling strategy (regular cooling operation, as is shown in FIG. 1), ambient air 11 is used to directly cool the turbine generator 7. If the hub filters 21 become wet, the air flow entering the generator 7 from the hub 22 will be reduced due to the larger pressure drop across the filter 21. An indication of the filters getting wet may be a higher winding head temperature on the generator (DE) side compared to the NDE side (i.e. the second side 45) due to the reduced cooling flow on the first side 25. In the control software of the controller 27 for example, this misalignment of the winding head temperature may be used as an indication for reduced filter flow on the first side 25. This may enable a moisture removal procedure by shutting off the generator fans (i.e. the heated cooling air withdrawal fans) 17 and turning on all nacelle fans (i.e. the inlet fans 9), as is illustrated in FIG. 2. The nacelle inside will then be pressurized. The cooling air will enter the generator 7 only on the second side 45 (i.e. the second cooling air 15, 33, 35) and will be heated up by the generator losses. As the hub 22 and the exhaust exit 41 are both at ambient pressure, the heated air 19 will exit at both locations, thus at the regular cooling air exit opening 41 and at the hub opening 24. The heated dry air 19 will pass and go through the filter 21 and will absorb moisture caught in the filter material and will just dry out the filter 21. 30 minutes of this mode is deemed to be sufficient to dry out the filters 21 and normal cooling operation (i.e. the regular cooling operation) may be resumed. The method may solely be performed by software control using the controller 27.

The hot generator air may be used during the moisture removing operation to clear (to dry) the cooling air filter 21 and clear it of any moisture it may contain thus making sure the filters do not accumulate moisture over time. By removing moisture from the filters, the 300% increase in pressure losses may be avoided during normal operation which otherwise may reduce cooling performance. The methods may be performed using existing sensors and making a detection control solution.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for removing moisture from a cooling air filter installed for filtering first cooling air for cooling a generator from a first end, the method comprising:
   pressurizing second cooling air cooling the generator from a second end;
   allowing the second cooling air having received heat from the generator to pass through the cooling air filter, in order to absorb and thereby reduce moisture from the cooling air filter.

2. The method according to claim 1, wherein the method is triggered by:
   measuring a first temperature value at or close to the first end;
   measuring a second temperature value at or close to the second end;
   comparing the first temperature value with the second temperature value;
   determining that the first temperature value is greater than the second temperature value by at least a threshold.

3. The method according to claim 1,
   wherein the first temperature value substantially equals or is indicative of a winding head temperature of the generator at the first end,
   wherein the second temperature value substantially equals or is indicative of a winding head temperature of the generator at the second end.

4. The method according to claim 1, wherein the method lasts between 15 min and 45 min.

5. The method according to claim 1, wherein the pressuring comprises:
   turning on to maximal capacity or at least increasing capacity of inlet fans that convey ambient air into a space region as the second cooling air, in order to increase the pressure of the second cooling air within the space region; and/or
   turning off or at least reducing capacity of heated cooling air withdrawal fans that are installed to withdraw cooling air being heated by heat reception from the generator.

6. The method according to claim 1, wherein the heated cooling air withdrawal fans are configured to, when turned on during a regular cooling operation, convey the heated cooling air to an outside, wherein the heated cooling air in particular comprises heated first cooling air and heated second cooling air.

7. The method according to claim 1, wherein the space region is at least a portion of an inside of a nacelle; and/or
   wherein the cooling filter comprises at least one particle filter, in particular F7 filter, filtering particles having a size of between 0.3 and 10 μm; and/or
   wherein the first end of the generator is closer to a hub at which plural blades are connected than the second end of the generator.

8. The method for operating a cooling system for cooling a generator of a wind turbine, comprising:
   cooling the generator according to a regular cooling operation; and
   performing a moisture removing operation according to a method of claim 1.

9. The method according to claim 8, wherein
   during the regular cooling operation the method comprises:

running the inlet fans to convey ambient air into the space region as the second cooling air;

running the heated cooling air withdrawal fans to withdraw cooling air being heated by heat reception from the generator and in particular convey it via a regular cooling air exit opening through which all of the heated cooling air flows to the outside.

10. The method according to claim 8, wherein during the moisture removing operation at least a portion of the heated cooling air is conveyed to an outside via the cooling filter in a heated cooling air flow direction substantially opposite to a flow direction of the first cooling air during a regular cooling operation.

11. The method according to claim 8, wherein during the moisture removing operation at least another portion of the heated cooling air is conveyed to an outside, in particular via the shut off heated cooling air withdrawal fans and, via the regular cooling air exit opening, wherein the regular cooling air exit opening is at a back of the nacelle.

12. The method according to claim 8, wherein during the regular cooling operation the first cooling air and the second cooling air pass, from radially outwards through at least one cooling channel in a lamination of the generator running radially inwards and is sucked from the generator and conveyed into an cooling air exit duct leading to the regular cooling air exit opening.

13. The method according to claim 8, wherein during the regular cooling operation the first cooling air and the second cooling air cool the generator from the first side and from the second side, respectively and heated first cooling air and heated second cooling air commonly exit at the back of the nacelle.

14. A cooling system for cooling a generator of a wind turbine, the system comprising:
   inlet fans;
   heated cooling air withdrawal fans;
   a cooling air filter; and
   a controller configured to supply control signals to the inlet fans and to the heated cooling air withdrawal fans,
   to control the inlet fans to convey ambient air into a space region as second cooling air and pressurize the second cooling air; and
   to control the heated cooling air withdrawal fans to withdraw cooling air being heated by heat reception from the generator and further to allow the second cooling air having received heat from the generator to pass through the cooling air filter, in order to absorb and thereby reduce moisture from the cooling air filter.

15. The cooling system according to claim 14, further comprising:
   a first temperature sensor configured to measure a first temperature value at or close to a first end of the generator;
   a second temperature sensor configured to measure a second temperature value at or close to a second end of the generator;
   wherein the controller is further configured to compare the first temperature value with the second temperature value and trigger a moisture removing operation to remove moisture from the cooling air filter, if the controller determines that the first temperature value is greater than the second temperature value by at least a threshold.

* * * * *